United States Patent [19]

Masuyama et al.

[11] 4,251,843
[45] Feb. 17, 1981

[54] DISC JACKET FOR RETAINING MAGNETIC RECORDING DISC

[75] Inventors: Kenichi Masuyama; Tatsuji Kitamoto, both of Odawara; Yasuyuki Yamada, Manazuru, all of Japan

[73] Assignee: Fuji Photo Film Co., Ltd., Minami-ashigara, Japan

[21] Appl. No.: 75,546

[22] Filed: Sep. 14, 1979

Related U.S. Application Data

[63] Continuation of Ser. No. 881,436, Feb. 27, 1978, abandoned.

[30] Foreign Application Priority Data

Mar. 8, 1977 [JP] Japan .................................. 52/25001

[51] Int. Cl.³ .......................... G11B 23/02; G11B 5/00
[52] U.S. Cl. ..................................... 360/137; 360/133
[58] Field of Search ............ 360/133, 137, 128, 97–99, 360/86

[56] References Cited

U.S. PATENT DOCUMENTS

| 3,668,658 | 6/1972 | Flores et al. .......................... 360/133 |
| 3,864,755 | 2/1975 | Hargis .................................. 360/133 |
| 3,931,644 | 1/1976 | Ward .................................... 360/133 |
| 3,947,893 | 3/1976 | Hall, Sr. .............................. 360/133 |
| 4,106,067 | 8/1978 | Masuyama ........................... 360/137 |

FOREIGN PATENT DOCUMENTS 2545091  8/1976  Fed. Rep. of Germany ........... 360/133

Primary Examiner—John H. Wolff
Attorney, Agent, or Firm—Gerald J. Ferguson, Jr.; Joseph J. Baker

[57] ABSTRACT

The inner surface of a disc jacket for retaining a magnetic recording disc is provided with a fibrous layer containing an antistatic agent. The fibrous layer is composed of a nonwoven cloth impregnated with the antistatic agent. The antistatic agent may be applied to the nonwoven cloth by spraying instead of impregnation.

3 Claims, 5 Drawing Figures

DISC JACKET FOR RETAINING MAGNETIC RECORDING DISC

This is a continuation of application Ser. No. 881,436, filed Feb. 27, 1978, now abandoned.

BACKGROUND OF THE INVENTION

1. Field of the Invention

This invention relates to a magnetic recording disc jacket, and more particularly to a jacket for retaining therein a magnetic recording disc while the recording disc is in use in a magnetic disc recording and reproducing machine.

2. Description of the Prior Art

A magnetic recording disc jacket is, as disclosed in U.S. Pat. No. 3,668,658 and Sidney Davis, Computer Design, Pages 55 to 64 (June 1973) Published by Computer Design Publishing Corp., Amsterdam, Netherland, made of plastic sheet material which rotatably retains therein a magnetic recording disc (hereinafter referred to simply as a "disc"). The disc has a thickness of 80 $\mu$m and a diameter of 20 cm, and the disc jacket has a thickness of 2 mm and is 20.3 cm square. The disc jacket is used for not only retaining the disc but also for holding the same while the disc is driven in a magnetic disc recording and reproducing machine (hereinafter referred to as a "magnetic disc recorder" or simply as a "recorder").

The conventional disc jacket is provided on the inner surface thereof with a fibrous layer made of nonwoven cloth or the like for protecting and cleaning the surface of the disc. In order to reduce the torque required for rotating the disc retained in the disc jacket, it is known to use a lubricant on the inner surface of the disc jacket. For example, it is disclosed in German Pat. No. 2,545,091 that the nonwoven cloth can be impregnated with a lubricant mainly consisting of fluoridized alkylpolyether so that the disc may be smoothly rotated in the disc jacket.

However, the torque required for rotating the disc in a disc jacket is also increased by an electrostatic force induced between the disc and the fibrous layer. The electrostatic force is created by the electrostatic charges carried by the disc. The disc is electrostatically charged by the friction between the disc and the fibrous layer on the inner surface of the disc jacket.

The increase in torque prevents the smooth rotation of the disc and this results in drop-outs of the recording and reproducing signals. Further, by the friction between the fibrous layer and the disc, the fibers of the fibrous layer are apt to be abraded. Furthermore, the electrostatic charges carried by the disc surface attract dust, magnetic material chips and fiber chips, which results in signal drop-outs.

SUMMARY OF THE INVENTION

Therefore, it is the primary object of the present invention to provide a disc jacket in which the disc retained therein is prevented from being electrostatically charged.

Another object of the present invention is to provide a disc jacket in which a disc retained therein is smoothly rotatable.

Still another object of the present invention is to provide a disc jacket in which dust or the like is prevented from sticking to the disc retained therein.

A further object of the present invention is to provide a disc jacket which enhances the durability of the disc retained therein.

The disc jacket in accordance with the present invention is characterized in that the fibrous layer attached to the inner surface thereof contains an antistatic agent. The antistatic agent prevents the disc and the disc jacket from being electrostatically charged and accordingly the disc retained therein can be smoothly rotated and the disc and the disc jacket are kept free from dust or the like. Therefore, the recording and reproduction can be conducted with high performance without drop-outs.

DESCRIPTION OF THE PREFERRED EMBODIMENT

Figure 1:
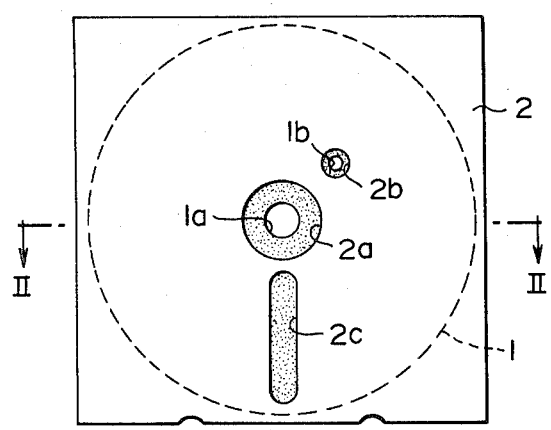
FIG. 1 is a plan view of the disc jacket in accordance with an embodiment of the present invention.

The disc jacket in accordance with the present invention comprises a square jacket 2 in which a disc 1 is retained as shown in FIG. 1. The disc 1 is composed of a plastic support layer such as polyethylene telephthalate (PET) and a magnetic layer or layers applied on one or both surfaces of the support layer. The disc is rotated to record a magnetic signal thereon along a spiral recording path. The disc 1 is provided with a central hole 1a through which a centering cone of a floppy disc drive of a magnetic disc recorder is to be inserted. The disc 1 is further provided with an index hole 1b which is to be used for detecting the position of the disc in the recorder.

The jacket 2 is made, for instance, of a plastic such as polyvinyl chloride. The jacket 2 is made by punching a polyvinyl chloride sheet or other plastic sheet and then folding the punched sheet. After the sheet is folded, the marginal portions thereof are joined together to form a jacket to retain a disc therein. The jacket 2 is provided with openings 2a and 2b at positions corresponding to the central hole 1a and the index hole 1b of the disc 1, respectively. The size of the openings 2a and 2b of the jacket 2 is substantially larger than that of the holes 1a and 1b. The jacket 2 is further provided with a radially extending elongated access hole 2c to allow a magnetic head of a recorder (not shown) access to the disc 1 along a radial path with respect to the disc 1.

On the inner surface of the jacket 2 is a fibrous layer 3 attached by means of an adhesive or heat welding. The fibrous layer 3 is attached to the inner surface of the jacket 2 in order to protect the magnetic disc 1 and clean the surface of the disc 1 when the disc is rotated in the jacket 2. As the fibrous layer 3 can be used nonwoven cloth made by fibrous materials such as nylon (polyamide), polyesters, viscose rayon, cellulose acetate, polypropylene, acrylic resins, alkyl acrylate copolymers and so forth mixed with a binder to form an nonwoven cloth. The nonwoven materials are fabric-like products which are made by arranging fibers (the above descrived fibrous materials), in a web or mat form by a conventional method and then bonding the fibers to each other using an adhesive such as a natural latex, e.g., a latex of natural rubber, a synthetic latex or such in combination with urea resins or melamine resins adhesive, or by utilizing the adhesive force of the fibers themselves, e.g., when using polyethylenes, polypropylene or polyamides. Of the synthetic lattices, acrylonitrile-butadiene copolymers and acrylonitrile are preferred, with synthetic lattices of a molecular weight of about 800 to about 10,000 being most preferred.

In addition, other nonwoven materials, e.g., those which are made through fusion bonding can also be used, e.g., polyesters, polystyrenes and polyvinyl acetate, with usually a temperature of about 70 to about 250° C. being used for the bonding.

Many of the nonwoven materials disclosed above are commercially available as nonwoven fabrics, e.g., "PR-35" (produced by Sanko Vilene Co., Ltd., made by viscose rayon in acrylic resin binder) Vilene H-8103 (polyethylene terephthalate fiber), Vilene BX10, Vilene #3000, Vilene #4000 (produced by Japan Vilene Co., Ltd.), Nippon Cloth #1500, Nippon Cloth #1600 (produced by Nippon Cloth Industries Co., Ltd.), as are fibers of copolymers of polyethylene terephthalate (60 mol%) and rayon (40 mol%) bonded using a styrene-butadiene rubber as an adhesive and then formed into a sheet. As the fibrous layer 3 can also be used Japanese paper, synthetic leather or natural leather. Japanese paper is made from natural fibers, cellulose fibers being preferred, using bast fibers as a raw material, digesting the fibers to make single fibers and then making a paper therefrom. Bast fibers consist of celluloses about 3 to about 50 mm long by about 0.01 to about 0.08 mm wide. Examples of such are flax, hemp, jute, ramie, kozo, mitsumata and gampi. Of these fibers, kozo, mitsumata and gampi are preferred.

The thickness of the fibrous layer 3 of the present invention is preferably from about 20 to about 2,000 μm, even more preferably from 30 to 300 μm.

The above fibrous layer 3 is laminated on a base sheet using an adhesive or by thermocompression bonding, typically at about 1 Kg/cm² to about 25 Kg/cm² and at about 70° C. to about 150° C. for about 1 to about 30 min., though these conditions are not mandatory.

The aforesaid adhesives used in this invention include natural latexes, synthetic latexes and such latexes in combination with a urea or melamine resin adhesive, a synthetic rubber, a polyester, a vinyl acetate resin, a butyral resin, an acrylate resin, a vinyl chloride resin, a polyamide, a reclaimed rubber, starch, dextrin, glue, gum arabic, casein, polyvinyl alcohol, polyacrylamide, carboxymethyl cellulose, rosins, wax, paraffin, epoxy resins, isocyanate resins, phenyl resins, furan resins, nitrocellulose, etc. Preferred are those resins which have a softening point of about 30 to about 150° C., most preferably 50° to 120° C., and a molecular weight of about 1,000 to about 100,000. They are conveniently applied with a spray-gun, brush, blade, spatula, etc.

Examples of conveniently used adhesives are copolymers of vinyl chloride and vinyl acetate (about 30 to 90 wt% vinyl acetate), copolymers of ethylene and vinyl acetate (about 30 to 90 wt% vinyl acetate), terpene resins, copolymers of acrylonitrile and butadiene (about 20 to 40 wt% acrylonitrile) liner polyesters (copolymers of ethylene glycol and terephthalic acid at a 3:2 to a 2:3 molar ratio, respectively) and polyamide terpolymers (for example, caprolactam (20 to 80 wt%): lauryollactam (5 to 70 wt%): γ-methyl caprolactam (5 to 60 wt%)).

In the case of laminating the fibrous layer 3 on the base sheet by thermocompression bonding, the fibrous layer 3 or at least a portion of the constituents of the fibrous layer 3, e.g., an adhesive for the fibrous or base sheet, must be a thermoplastic resin. Preferably, both the fibrous material and base sheet comprise or are made of a thermoplastic resin.

Preferred of such thermoplastic resins are those which have a softening point of 150° C. or less, an average molecular weight of about 10,000 to about 200,000 and a polymerization degree of about 200 to about 500, e.g., polypropylenevinyl chloride copolymers, ABS resins, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyamides, etc.

An antistatic agent is included in the fibrous layer 3 to prevent it from being electrostatically charged. The antistatic agent may be introduced to the fibrous layer 3 by impregnation or simple application such as by spraying. When a nonwoven cloth is used as the fibrous layer 3, the antistatic agent is mixed with the binder which is used for binding the fibers.

As the antistatic agent can be used ionic type (anionic type and cationic type), nonionic type and amphoteric type antistatic agents.

As the anionic type antistatic agents can be used sulfonates such as $R^1(OSO_3Na)COOR^2$, wherein $R^1$ is alkyl group having 8 to 22 of carbon atoms and $R^2$ is alkyl group having 1 to 5 of carbon atoms; sulfuric esters such as $R^3OSO_3Na$, wherein $R^3$ is alkyl group having 1 to 5 of carbon atoms; polyethylene glycol ether sulfuric esters such as $R^4(C_2H_4O)_nOSO_3Na$, wherein $R^4$ is alkyl having 8 to 18 of carbon atoms and n is an integer of more than 6 (sulfuric esters of polyoxyethylene alkyl ether) and

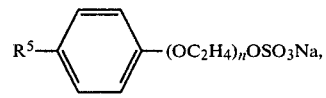

wherein $R^5$ is alkyl group having 7 to 10 of carbon atoms and n is an integer of more than 6 (sulfuric esters of polyoxyethylene alkyl phenyl ether); phosphoric esters such as $R^6PO(ONa)_2$, wherein $R^6$ is alkyl group having 1 to 12 of carbon atoms (alkyl phosphate), $R^7(C_2H_4O)_3OPO(ONa)_2$, wherein alkyl having 12 to 18 of carbon atoms and n is an integer of more than 4 (polyoxyethylene alkyl phosphate) and

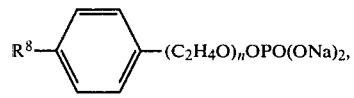

wherein $R^8$ is alkyl group having 11 to 15 of carbon atoms and n is an integer more than 4 (polyoxyethylene alkyl phenyl phosphate); phosphor containing anionic surface active agents such as penta alkyl phosphate, and the like.

As the cationic type antistatic agents can be used quarternary ammonium salts such as alkyl trimethyl ammonium salts having $R^9N^+(CH_3)_3 \cdot X^-$ (wherein $R^9$ is alkyl group having 8 to 18 of carbon atoms and X is a chlorine atom) of chemical formula; alkyl dimethyl benzyl ammonium salts having

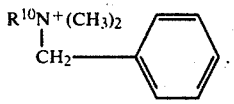

$X^-$ (wherein $R^{10}$ is alkyl group having 12 to 18 of carbon atoms and X is a chlorine atom) of chemical formula; alkyl amino ethanols having $[R^{11}-N(CH_3)_2CH_2CH_2OH]^+OH^-$ (wherein $R^{11}$ having 12 to 18 of carbon atoms) of chemical formula; pyrridinium salts having

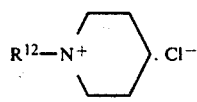

(wherein $R^{12}$ having 12 to 18 of carbon atoms) of chemical formula (alkyl pyrridinium salts); and the like.

As the nonionic type antistatic agents can be used polyethylene glycol derivatives such as polyoxyethylene alkyl ethers having $R^{13}-O(CH_2CH_2O)_nH$ (wherein $R^{13}$ is alkyl group having 12 to 18 of carbon atoms and n is an integer of 8 to 15) of chemical formula, polyoxyethylene aryl ethers having

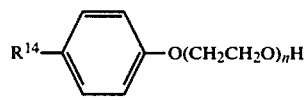

(wherein $R^{14}$ is alkyl group having 7 to 10 of carbon atoms and n is an integer of 8 to 15) of chemical formula, etc.; polyhydric alcohol derivatives such as glycol alkyl esters having

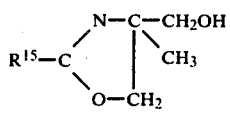

(wherein $R^{15}$ is alkyl group having 3 to 18 of carbon atoms) of chemical formula, etc.; fatty acid amido; fatty acid amide such as fatty acid ethanol amide having $R^{16}-CON(CH_2CH_2OH)_2$ (wherein $R^{16}$ is alkyl group having 8 to 18 of carbon atoms) of chemical formula, methylol amide having $R^{17}-CONH-CH_2OH$ (wherein $R^{17}$ is alkyl group having 8 to 18 of carbon atoms) of chemical formula, oxymethyl ethanol amide having $R^{18}-CONHCH_2CH_2OCH_2OH$ (wherein $R^{18}$ is alkyl group having 8 to 18 of carbon atoms) of chemical formula, etc.; guanidine derivatives such as fatty acid phenyl guanidine, etc.; polyoxyethylene alkyl esters having $R^{19}-COO(CH_2CH_2O)_nH$ (wherein $R^{19}$ is alkyl group having 12 to 18 of carbon atoms and n is an integer of 5 to 30) of chemical formula, etc.; and the like.

As the amphoteric type antistatic agents can be used polyacryl amide; stearyl dialkyl betaine having

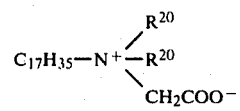

(wherein $R^{20}$ is alkyl group having 12 to 18 of carbon atoms) of chemical formula such as stearyl dimethyl betaine, etc; lauryldihydroxyalkyl betaine having

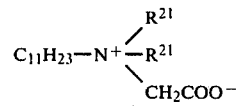

(wherein $R^{21}$ is hydroxy alkyl group having 1 to 4 carbon atoms) of chemical formula such as lauryldihydroxyethyl betaine, etc.; and the like.

The antistatic agent is included in the fibrous layer at a ratio of about 1 to about 30 weight parts, more preferably 1 to 15 weight parts, per 100 weight parts of the fibrous layer. If the amount of the antistatic agent is less than this, the desirable antistatic effect and lubricating effect are not obtained. If it is more than this the antistatic agent will stick to the magnetic disc and the performance of the magnetic recording and reproduction will be degraded.

The antistatic agent is diluted in water or a volatile solvent to obtain a 0.1 to 10%, more preferably 0.1 to 2%, dilute solution thereof. The dilute solution may be sprayed on the nonwoven cloth. Alternatively, a fibrous material is dipped in the dilute solution for 1 to 60 seconds and then the dilute solution is volatilized to have the fibrous material impregnated with the antistatic agent. In case of spray applying the antistatic agent, the fibrous material can be moved in the lengthwise direction while the antistatic agent is being sprayed thereon. In case of impregnating the fibrous material with the antistatic agent, the fibrous material can be moved through the dilute solution.

Besides the above mentioned spray method and impregnating method, it is also possible to mix an antistatic agent having polyethylene glycol chains with fibers when the fibers are synthesized into nonwoven cloth. Further, it is also possible to mix this kind of antistatic agent with a plastic used as a binder for the nonwoven cloth. These methods are advantageous in that the antistatic effect lasts for a longer time than in the methods previously mentioned.

Now the present invention will be described in detail with reference to several examples thereof.

Three samples of antistatic agent (No. 1–No. 3 and No. 5) as shown in Table I were diluted with water to make 2% dilute solutions of the antistatic agent. In each dilute solution was dipped a nonwoven cloth of 150 μm thick (viscose rayon nonwoven fabric comprising anacrylic binder, "PR-35" made by Sanko Vilene Co., Ltd.) for 20 seconds. The nonwoven cloth was dried in a stream of hot air at 150° C. to volatilize the solvent. As a result, 5 weight parts of the antistatic agent was incorporated in 100 weight parts of the nonwoven cloth.

TABLE I

| Sample No. | Antistatic Agent |
|---|---|
| 1 | Anionic type: "Avitone" Made by Du Pont ($C_{18}H_{35}OCO \cdot COOH \cdot H_2NC_{18}H_{35}$) |
| 2 | Cationic type: "Catanac SN" quatenary ammonium |

TABLE I-continued

| Sample No. | Antistatic Agent |
|---|---|
| | salts made by American Cyanamide Corp. (C$_{17}$H$_{35}$CONHCH$_2$CH$_2$—N$^+$(CH$_3$)(CH$_3$)—CH$_2$CH$_2$OH . NO$_3{}^-$) |
| 3 | Nonionic type: "Glim" Made by General Aniline (ethylene oxyde condensate) |
| 4 | None (sample for comparison) |
| 5 | Amphoteric type: betain type emphoteric antistatic agent (C$_{12}$H$_{25}$—N$^+$(CH$_3$)(CH$_3$)—CH$_2$COO$^-$) |

Figure 2:
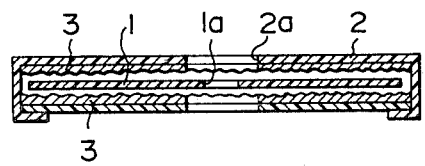
FIG. 2 is a cross-sectional view taken along the line II—II of FIG. 1, and FIGS. 3 to 5 are graphs which show the variation in torque required for rotating the disc in the disc jacket of the invention measured under the conditions of different humidity.

Then, the nonwoven cloth impregnated with the antistatic agent was spot-welded to a hard plastic sheet of a copolymer of 90% vinyl chloride and 10% vinyl acetate. The spot-welding was conducted by use of a heat welder having welding spots of 1 mm$^2$ size at intervals of 5 mm. The hard plastic sheet to which the nonwoven cloth was attached was punched and then folded into a jacket as shown in FIGS. 1 and 2. In the jacket was retained a disc having a diameter of 20 cm and a thickness of 81 μm accounted for by a 75 μm thick polyester base and two 3.0 μm thick magnetic layers applied one on either side thereof. The disc jacket thus prepared was mounted on a floppy disc drive (Model No. M892-11 made by Mitsubishi Electric Corp.) and the following two tests were conducted.

TEST I

Figure 3:
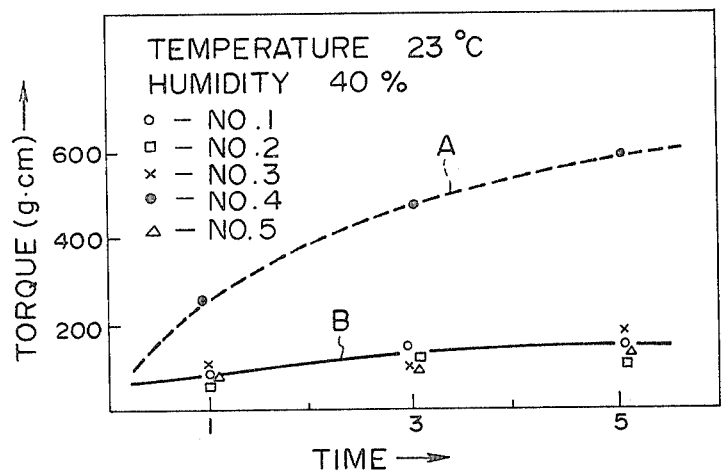
Figure 4:
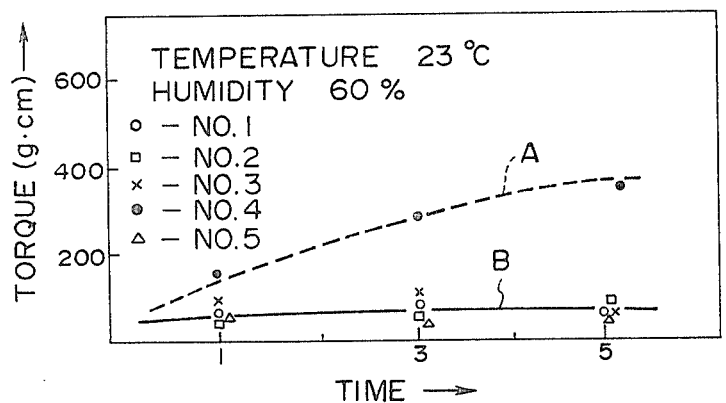
Figure 5:
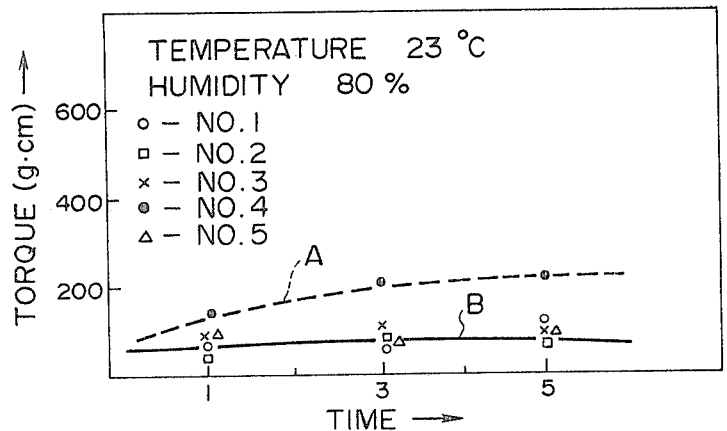

The starting torque when the disc jacket was mounted on a floppy disc drive and the torque over a subsequent five-hour period following start were measured at a temperature of 23° C. and at relative humidities of 40%, 60% and 80%. The results of the tests are shown in the graphs of FIGS. 3 to 5. In these graphs, the broken line A shows the result of the reference sample No. 4 which was not treated with the antistatic agent, and the solid line B shows that of the samples No. 1 to No. 3 and No. 5 in accordance with the invention.

As shown in FIGS. 3 to 5, the torque increases prominently in case of the reference sample No. 4 when the humidity is low. On the other hand, in case of the samples No. 1 to No. 3 and No. 5 the torque was small even when the humidity was low. Therefore, the disc jacket in accordance with the present invention is particularly advantageous when the humidity is low.

TEST II

Under the same conditions as in TEST I, drop-out was measured every six hours. In this test, no drop-out was found in samples No. 1 to No. 3 and No. 5 until 200 hours had lapsed after the start. In case of the sample No. 4, drop-out was observed when 24 hours had lapsed under 60% and 80% humidity conditions, and when 6 hours had lapsed under 40% humidity condition. The drop-out was caused by chips of the nonwoven cloth and by dust.

We claim:

1. A disc jacket for a magnetic disc comprising a disc jacket and a flexible magnetic disc retained in the disc jacket, said disc jacket having openings for operating the magnetic disc from outside, wherein the improvement comprises a fibrous layer containing antistatic agents attached to the inner surface of the jacket, said antistatic agent being selected from the group consisting of anionic type antistatic agents having a composition formula of (C$_{18}$H$_{35}$OCO.COOH.H$_2$NC$_{18}$H$_{35}$), cationic type antistatic agents having a composition formula of

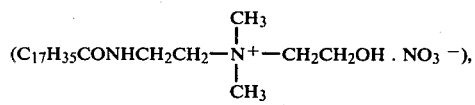

and amphoteric type antistatic agents having a composition formula of

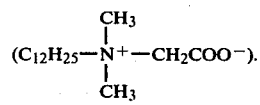

2. A disc jacket as claimed in claim 1 wherein said fibrous layer has a thickness of from about 20 to about 2,000 μm.

3. A disc jacket as claimed in claim 1 wherein about 1 to about 30 parts by weight of said antistatic agents are contained per 100 parts by weight of said fibrous layer.

* * * * *